INVENTOR.
*Dana B. Waring*
BY
*H. Hume Mathews*
ATTORNEY

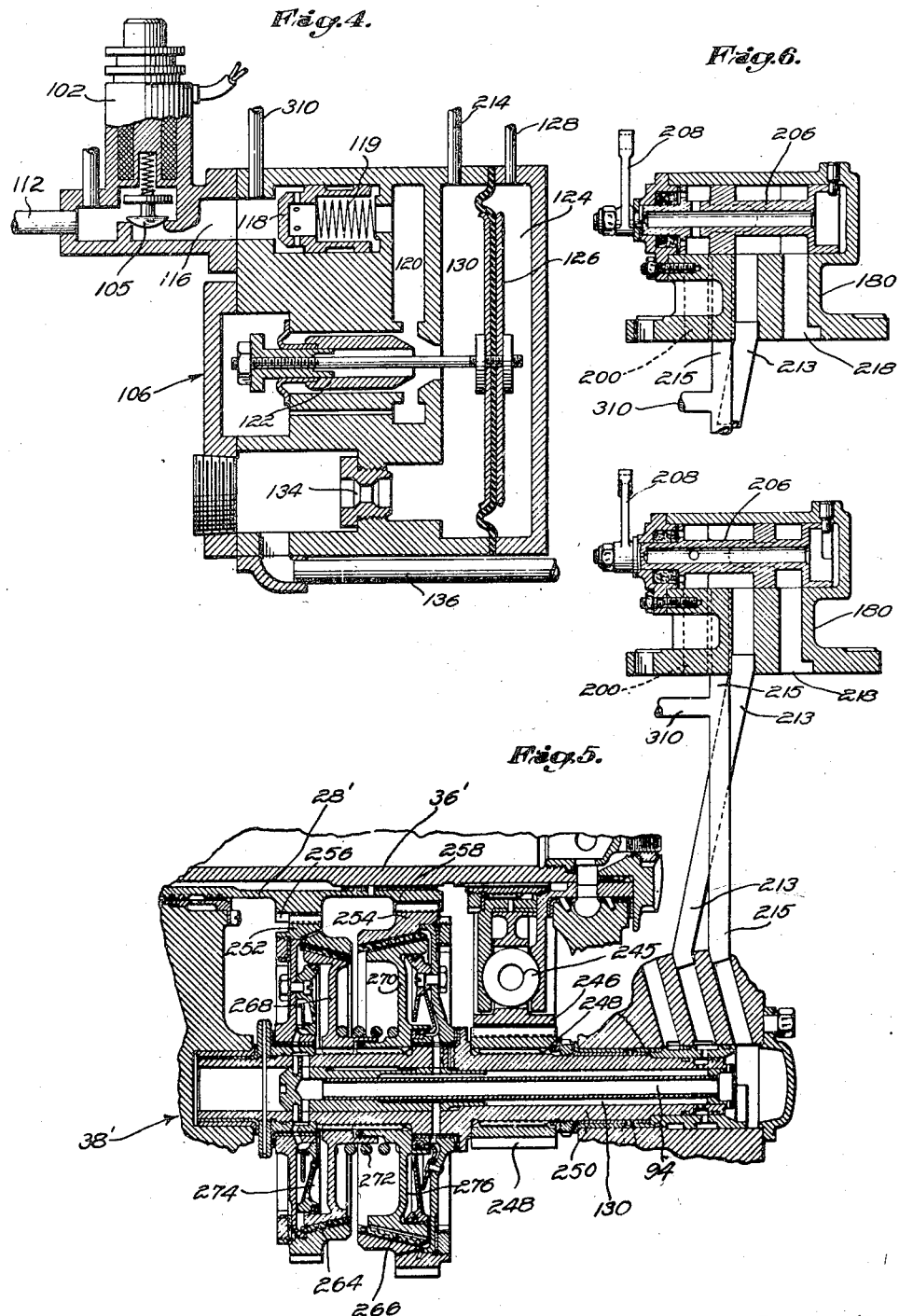

Patented Nov. 30, 1948

2,455,344

UNITED STATES PATENT OFFICE 2,455,344

IGNITION CONTROL

Dana B. Waring, East Hartford, Conn., assignor to United Aircraft Corporation, East Hartford, Conn., a corporation of Delaware Application June 25, 1945, Serial No. 601,437

8 Claims. (Cl. 123—117)

This invention relates to ignition timing systems, and particularly to improvements in an aircraft engine ignition timing system of the type disclosed in Jarvis application Serial No. 481,114, filed March 30, 1943, assigned to applicant's assignee.

An object of this invention is to provide improved means for controlling an ignition timing apparatus in accordance with variations in engine operating conditions.

Another object is to provide means for compensating an automatic engine ignition timing system for changes in combustion characteristics resulting from the operation of engine controls or regulating devices such as a supercharger speed setting mechanism or a water injection apparatus.

A further object is to provide improvements in control devices for internal combustion aircraft engines.

Other objects and advantages will be apparent from the specification and claims, and from the accompanying drawings which illustrate what is now considered to be a preferred embodiment of the invention.

In the drawings, Fig. 1 is a schematic view showing an ignition timing apparatus incorporating a compensator, or control device, constructed and arranged according to the teaching of this invention.

Fig. 4 is a sectional view of a water injection regulator and shows how the compensator of Figs. 1, 2 and 3 may be operatively connected with a water injection apparatus.

Fig. 5 is a partial sectional view of the supercharger speed selector valve and the change speed supercharger drive gear unit diagrammatically shown in Fig. 1, and including the connection for the compensator of Figs. 1, 2 and 3.

Fig. 6 is a sectional view of the selector valve in the high gear ratio position.

Changes in the combustion characteristics of the charging fluid of an engine require corresponding changes in spark advance, or the time at which ignition occurs with respect to piston position, for optimum engine performance. According to this invention, the ignition timing of an engine may be automatically compensated for changes in charge combustion characteristics, and particularly for those resulting from a change in the operating characteristics of a supercharger for the engine, or from the introduction of a combustion modifying ingredient, such as water, into the engine charge.

Figure 1:
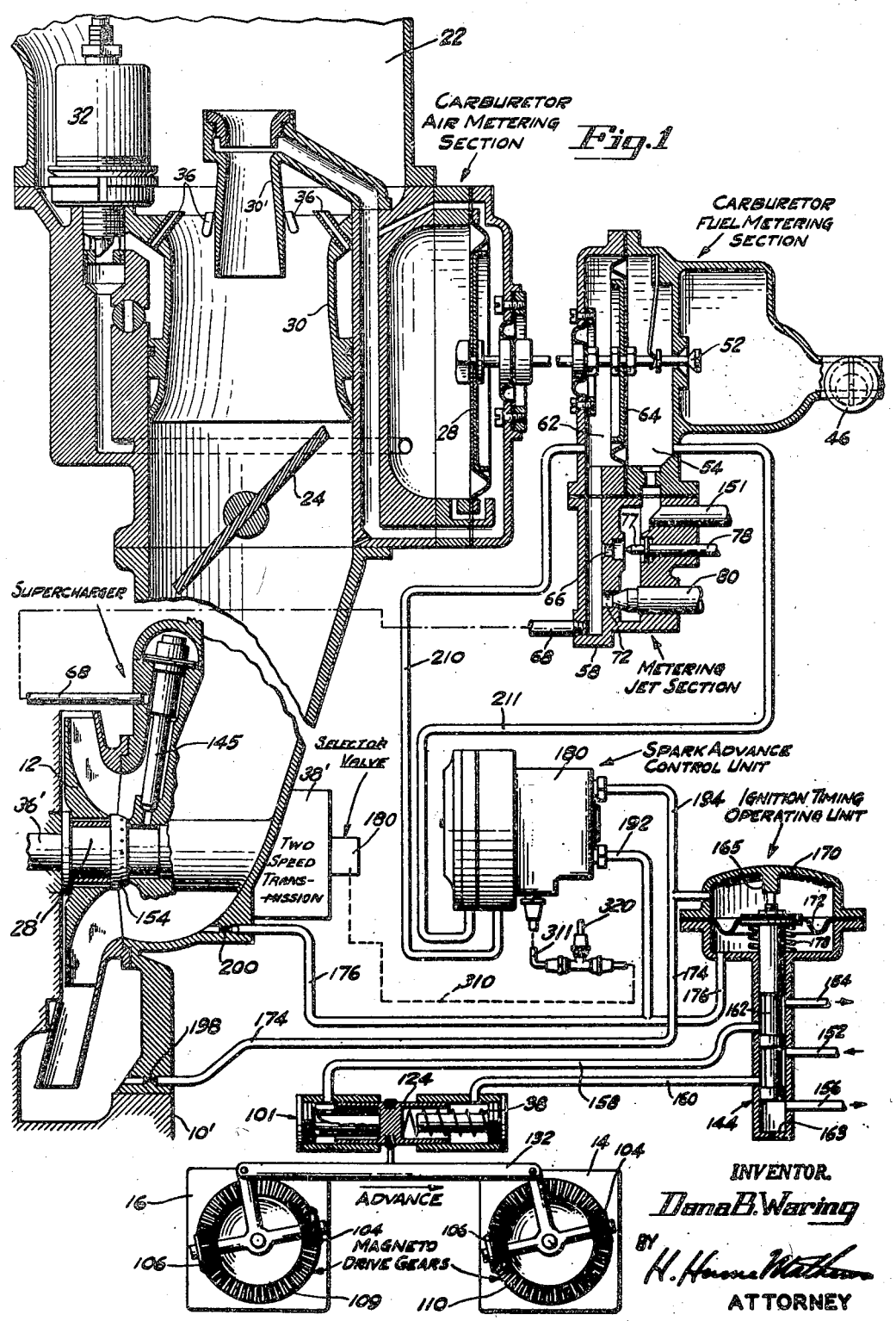

Referring to the drawings, Fig. 1 shows one form of the present invention as applied to an ignition timing apparatus of the type disclosed in the Jarvis application referred to above, and to which reference is made for a detailed description of the basic ignition system illustrated in the drawings of this application.

An engine, such as a radial aircooled aircraft engine, is supplied with charging fluid by a main stage supercharger having an impeller 12 mounted in a blower case, a portion of which is shown at 10'. The impeller is driven by the engine crankshaft (not shown) through a tailshaft 36', a change speed gear transmission 38' and a quill shaft 28'. Transmission 38' may be controlled by a selector valve 180, in a manner similar to that described in Hobbs Patent No. 2,323.601, granted July 6, 1943, and as illustrated in Figs. 5 and 6.

Intake air flows to the impeller 12 in an amount regulated by throttle 24 through a manifold 22, which may be fed directly from the ambient air or from the outlet of an auxiliary supercharger stage, in a known manner. The rate of flow by weight of air passing to the engine is measured by the carburetor air metering section comprising the venturis 30, 30', impact tubes 36, and altitude compensator 32. The rate of flow by weight of fuel to the engine is regulated by fuel valve 52, supplied with fuel by pump 46. The valve is actuated by an air head diaphragm 28 in the air metering section and the fuel head diaphragm 64 of the fuel metering section. As fully described in the said Jarvis application, or in Palmer application Serial No. 529,104, filed April 1, 1944, assigned to applicant's assignee, the air and fuel head diaphragms cooperate to maintain a fuel pressure drop or metering differential, which is a function of the rate of flow by weight of engine intake air, across metering section or control body 58, between unmetered fuel chamber 54 and metered fuel chamber 62. Thus the flow of fuel is regulated in predetermined ratio to the flow of intake air. This ratio may be manually set for rich or lean mixtures by the head 77 on the valve 78, which controls flow through jet 66. In the idling power range, idle valve 151 may be used to control the mixture strength. Economizer valve 80 opens jet 72 partially or fully to enrich the mixture in the high power range.

Metered fuel flowing from the control body 58 through line 68 may be raised in pressure and directly injected into the engine combustion chambers in a known manner, for instance as disclosed in Beardsley application Serial No. 302,749, filed November 3, 1939, assigned to applicant's assignee, now Patent No. 2,447,265 issued August 17, 1948, or it may be injected into the intake air by the discharge valve 145 and fuel spinner 154 as shown in Fig. 1, in the manner fully described in the Palmer application referred to above.

The engine spark plugs are supplied with ignition current by magnetos 14, 16 driven by the engine through a gear train including magneto drive gears 109, 110 and the bevel gears 104, 106, mounted on adjustable cages interconnected by link 132. Link 132 is moved to the right or left by piston 124 of the servo motor 101, to advance or retard the ignition timing. Spring 38 biases the piston to the spark retard position.

Servomotor 101 is connected with a fluid pressure source 152 and drains 154, 156 by lines 158, 160. The application of pressure from source 152 to one or the other side of piston 124 is controlled by a valve plunger 162, in the operating unit 144. The valve plunger is actuated by diaphragm 172 subjected by lines 174, 176 to the pressure rise directly across the supercharger. When the pressure rise increases to a predetermined value diaphragm 172 is forced downwardly to compress spring 178 and move plunger 162 in position to connect source 152 with line 158 and to connect line 160 with drain 156, and thereby move piston 124 to the right to advance the spark. When the pressure rise is below a predetermined value, spring 178 will hold plunger 162 and piston 124 in the spark retarded position. If desired, stops may be provided, as shown at 163 and 165, to limit the movement of the plunger 162.

Spring 178 is so selected as to hold the operating unit 144 in the retard position when the engine is idling. When the engine power output is increased to the cruising range, the increased pressure rise created by impeller 12 is sufficient to overcome the force of spring 178 and advance the spark. The pressure rise across the supercharger varies approximately with variations in engine power and has been found satisfactory not only as an actuating pressure for the spark advance operating unit but also as a control or datum pressure which regulates or determines the point at which the timing is advanced as engine power output enters the cruising range.

Figure 2:
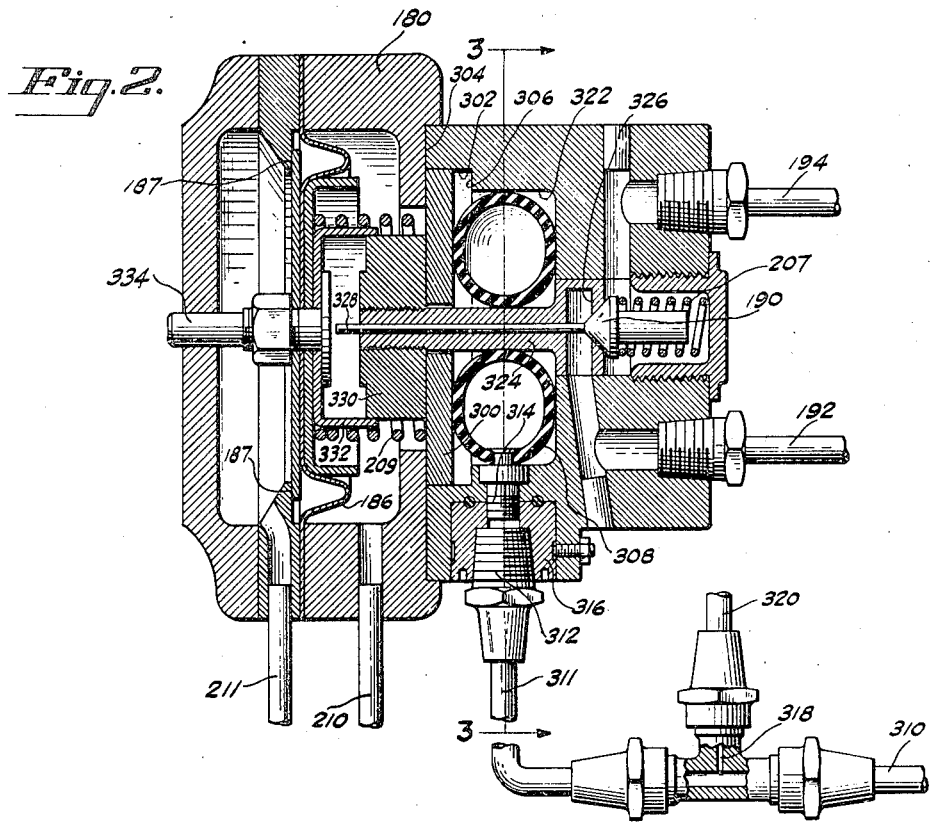
Fig. 2 is an enlarged sectional view of the compensator or control device of Fig. 1.
Figure 3:
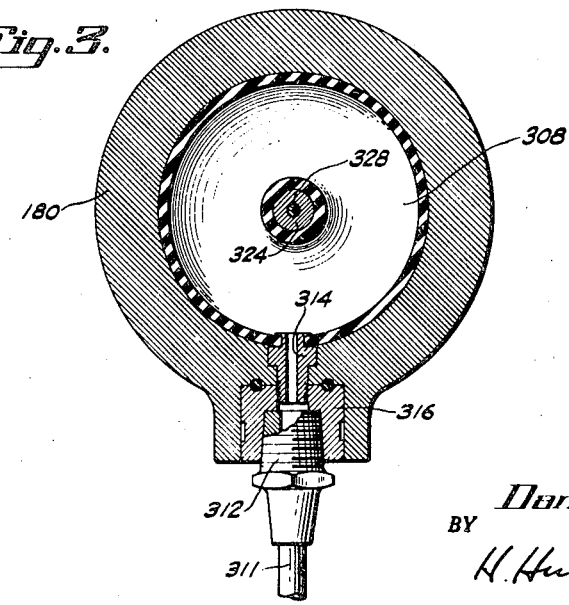
Fig. 3 is a sectional view along the line 3—3 of Fig. 2.

As the engine power output is increased beyond the cruising range and enters the high power range, it is desirable to retard the ignition timing to prevent detonation and for other reasons. This is accomplished by the spark advance control unit 180, best shown in Fig. 2, comprising a by-pass valve 190 for bleeding fluid from line 174 to line 176 by way of lines 194, 192. Because the flow capacity of valve 190 is materially greater than the flow capacity of restrictions 198, 200 in supercharger rim and throat lines 174, 176, the pressures on opposite sides of diaphragm 172 will be approximately equalized when the valve 190 is open, thus placing the operating unit 144 in the retarded spark position regardless of the value of the supercharger pressure rise.

Valve 190 is held closed by a spring 207 and is opened by a diaphragm 186 subjected by lines 211, 210 to the fuel metering pressure differential between chambers 54, 62. This pressure differential is an accurate measure of intake airflow (and therefore engine power) and consequently diaphragm 186 may be arranged to compress diaphragm spring 209 and valve spring 207 to open valve 190 at a predetermined point on the engine power output curve, which point is preferably at the extreme upper end of the cruising power range and which may be selected by spring 209 and spring 207.

The diaphragm spring urges diaphragm 186 against a stop flange 187 and bottoms on a piston 300 reciprocably mounted in a cylinder 302 in the control unit 180. The piston is moved in one direction (until it abuts shoulder 304) by a pressure responsive device such as a fluid tight expansible chamber or rubber inner tube 308 and is urged in the other direction (into abutment with shoulder 306) by the spring 209.

Fluid under pressure from conduit 310 is admitted to the expansible tube 308 through a fluid tight connection comprising pipe 311, nipples 312, 314 and plug 316. When pressure fluid is so admitted, tube 308 expands and forces piston 300 to the left, to compress spring 209 and increase the datum force or preload on the spring and thus increase to a higher predetermined value the amount of the fuel metering head across diaphragm 186 which is required to open by-pass valve 190. When the supply of pressure fluid to line 310 is terminated, fluid drains from tube 308 through pipe 311, flow restriction 318 and the drain tube 320, relieving the pressure in passage 310, 311 and enabling the tube to collapse and unload the spring 209 by permitting piston 300 to be moved into abutment with stop 306. The flow capacity of restriction 318 is preferably made very small, so that an application of fluid pressure to line 310 is sufficient to expand tube 308 even though a small amount of the fluid drains through the restriction. Drain tube 320 may, of course, be arranged to return the fluid draining therethrough to the tank or sump (not shown) from which the line 310 is supplied.

Tube 308 is positioned within a recess 322 and the tube and the piston 300 surround the extension 324 of the valve seat 326. The valve seat and its extension are fixed within the casing 180 and the extension has a bore therein for guiding stem 328 of valve 190 in its reciprocal movements. The extension has a cap 330 fixed thereto, for guiding the movements of the cup shaped diaphragm washer 332. The cap may also serve as an inner piston stop cooperating with the outer piston stop 304. Diaphragm 186 is also guided by the rod 334. Seals (not shown) are preferably provided where the rod 334 passes through casing 180 and where stem 328 passes through extension 324, but it is not necessary to seal off the chamber 322 from the diaphragm metered fuel chamber. Therefore piston 300 need not be fluid tight.

Fluid line 310 is diagrammatically shown in Fig. 1 as connected to the selector valve 130, which governs the gear ratio of the supercharger drive 38'. This valve, shown in detail in Figs. 5 and 6, includes a handle 208 which is manually moved between the low gear ratio position of Fig. 5 and the high gear ratio position of Fig. 6, to control the speed ratio of the transmission 38'.

Transmission 38' (Fig. 5) includes a lay or clutch shaft 250 to which the pinion 248 and the clutch elements 268, 270 are splined and on which the gear members 252 and 254 are rotatably supported. Gear 252 has a clutch face or friction band 264 thereon with which the clutch element 268 may be engaged, by axial movement of the element along the splines on the shaft 250, to form a relatively low speed ratio drive for the impeller 12. Gear 254 is provided with a similar band 266 which is engaged by axial movement of element 270 to form a high speed ratio drive.

Power is transmitted from the engine crankshaft to the impeller 12 through the tail shaft 36', the gear 246 (which incorporates a spring drive unit 245), pinion 248, shaft 250 and either low speed gear 252 or high speed gear 254, depending upon which of the clutch elements 268, 270 is engaged.

Each clutch is urged toward disengaged position by a spring 272 which biases the clutch elements 268, 270 away from the clutch bands 264, 266. To engage one or the other of the clutches fluid under pressure (such as engine lubricating oil) is admitted to one or the other of the cylinders or chambers 274, 276, respectively associated with each clutch. The parts are so arranged that fluid admitted to either chamber acts on the corresponding clutch element to move it axially, like a piston, to compress the spring 272 and to engage the clutch element with the surrounding gear.

Admission of fluid to the chambers 274, 276 is controlled by valve 180, shown in the low speed ratio position in Fig. 5, with the low gear clutch 268, 252 engaged. When the valve handle 208 and shaft 206 are in the position shown in this figure, fluid is admitted from the pressure source 218 to the pipe 215. From there it passes through the inner bore 94 to the low clutch member 274, where it forces element 268 into driving contact with band 264 and engages the transmission in low gear ratio, to drive the impeller at a low speed relative to engine speed. When pressure fluid is being admitted to pipe 215 the high ratio clutch chamber 276 is connected to the drain 200, by bore 130 and pipe 213. Consequently spring 272 will hold the high clutch element 270 disengaged when the low clutch element 268 is engaged.

Rotation of shaft 206 by handle 208 from the low ratio position of Fig. 5 to the high ratio position of Fig. 6 connects the pressure source 218 to the high clutch line 213 and connects the low clutch line 215 to the drain 200. Thus, in the high ratio position of valve 180 pressure fluid is admitted to chamber 276 to engage the transmission in high gear ratio and the low clutch chamber 274 is connected to drain, permitting spring 272 to disengage the low clutch.

When the valve 180 is in the low speed ratio position, and the supercharger is being driven at a relatively low speed relative to the engine, the low clutch lines 94 and 215, and consequently the line 310 connected thereto, contain fluid under pressure. In the high speed ratio position of valve 180 the lines 94 and 215, and consequently line 310, are connected to drain 200, and there will be little or no pressure therein. Therefore the tube 308 of the spark advance control unit will be expanded so as to hold piston 300 against stops 304, 330 when the supercharger is being driven in low gear ratio; and the tube will be collapsed, with piston 300 abutting stop 306, when the supercharger is being driven in the high gear ratio.

Thus the tube 308 will be expanded and the control unit 180 will be actuated to open valve 190 at a predetermined higher value of intake airflow to equalize the pressures in lines 174, 176 and retard the spark when the supercharger is in low gear ratio; and the tube 308 will be collapsed and the control unit actuated to retard the ignition timing at a predetermined lower value of intake airflow when the supercharger is in high gear ratio.

The ignition timing system automatically regulates the spark advance to advance the spark as engine power output is increased to the cruising range (when the supercharger rise overcomes the force of spring 178) and then to retard the spark as the power output is further increased to the high power range (when the fuel metering differential overcomes the force of springs 209, 207). But with the apparatus shown in Figs. 1–3, 5 and 6, the point at which the spark is retarded as the power increases to the high power range will be varied in accordance with changes in supercharging conditions. In high blower ratio, the spark will be moved to retard position by the opening of valve 190 at a relatively low engine cruising power, thus tending to prevent detonation such as might otherwise occur with advanced spark and high power in high blower ratio. In low blower ratio, valve 190 will remain closed and the spark will be maintained in advance position until a relatively high engine cruising power is reached, thus enabling the full benefit of advanced spark to be obtained in the relatively high cruising power range when the blower is in low ratio and detonation is not so likely to occur.

The tube 308 may also be connected with other sources of fluid pressure which vary with engine operating conditions, so as to reset the datum of the control unit 180 in accordance with other changes in operating conditions resulting in changes in the combustion characteristics of the engine charge.

Fig. 4 shows such an alternative source of fluid pressure for the fluid pressure responsive device 308. In this figure, a coolant or anti-detonant such as water is admitted to the water regulator 106 through line 112, fed by a pump from a water supply tank (not shown). As specifically described in the Palmer application No. 529,104, valve 122 in regulator 106 is actuated by a diaphragm 126 between chamber 124, subjected to unmetered fuel pressure by line 128, and the unmetered water chamber 130.

When it is desired to introduce water into the engine intake air the electrical solenoid 102 is energized, either manually or automatically, causing valve 105 to lift and admit water under pressure from line 112 to chamber 116. The resultant increase in water pressure in chamber 116 opens check valve 118 against the force of spring 119 and the water flows into chamber 120. From there it flows into chamber 130 in an amount regulated by valve 122, which is actuated by diaphragm 126 so as to maintain the water pressure in chamber 130 equal to the unmetered fuel pressure in chamber 124. As water discharge line 136 is preferably connected to the fuel discharge line 68, the pressure drop across the water metering jet 134 will be maintained equal to the fuel metering pressure differential and the water will be introduced into the engine charge in predetermined ratio by weight to engine intake airflow.

According to the modification of Fig. 4, the line 310 from the control unit is connected to the chamber 116 of the water regulator, instead of to the supercharger selector valve as shown in Figs. 1–3, 5 and 6. With such an arrangement, when valve 105 is opened and water begins to flow to the engine the pressure in line 310 will increase along with the rise in pressure in chamber 116. This causes tube 308 to expand and reset the control unit 180 so as to open valve 190 only when the engine intake airflow and power output has increased to a higher value than would be required to open the valve when water is not being injected. If water injection is terminated, for instance by closing valve 105, the pressure in line 310 will drop (the restriction 318 may be provided for this purpose) and the tube 308 will collapse and unload spring 209 and thereby reset the control unit to open at a lower intake airflow.

With the arrangement of Figs. 1-3, 5 and 6 the control unit is compensated in the manner described above to regulate the ignition timing in accordance with changes in supercharging conditions, and specifically for changes in the speed ratio of the supercharger drive.

In the modification of Fig. 4, the control unit is compensated in a similar manner to regulate the ignition timing in accordance with changes in the condition of the engine charge, and specifically for changes in the composition of the engine charge.

It is to be understood that the invention is not limited to the specific embodiment herein illustrated and described, but may be used in other ways without departure from its spirit as defined by the following claims.

I claim:

1. In an engine ignition timing mechanism, a first source of fluid pressure, a second source of fluid pressure, means responsive to fluid pressure from said first source for advancing the ignition timing, means responsive to fluid pressure from said second source for retarding said timing, and fluid pressure responsive means independent of said fluid pressures from said first and second sources for controlling said timing in accordance with variations in an engine operating condition.

2. In an aircraft engine having a supercharger and a multi-speed ratio transmission for driving said supercharger by said engine, mechanism including an adjustable intake airflow responsive device for varying the ignition timing of said engine in accordance wtih variations in engine power output, and means for adjusting said device in accordance with changes in the speed ratio of said transmission.

3. In an ignition timing apparatus for an engine having a supercharger, mechanism responsive to the pressure rise across said supercharger for varying the ignition timing, and means independent of variations in said pressure rise for regulating the operation of said mechanism in accordance with changes in the speed of said supercharger.

4. In an aircraft engine having a supercharger, an ignition timing apparatus actuated by the pressure rise across said supercharger, and means for controlling the operation of said apparatus in accordance with changes in the speed of said supercharger relative to the speed of said engine.

5. An ignition timing system for an engine having a supercharger, comprising, an operating unit actuated by the pressure rise directly across said supercharger for advancing the ignition timing, an adjustable control unit connected to said operating unit and actuated by a pressure differential which is a measure of engine intake airflow for retarding the ignition timing, and means indicative of changes in the combustion characteristics of the engine charge for adjusting said control unit.

6. The system of claim 5, in which said operating unit is actuated to advance the timing at a predetermined value of said pressure rise and in which said control unit is actuated at values of said fluid pressure differential which are determined by said adjusting means.

7. An ignition timing system for an engine having an engine driven supercharger, comprising, an operating unit actuated by the pressure rise directly across said supercharger for advancing the ignition timing, an adjustable control unit connected to said operating unit and actuated by a pressure differential which is a measure of engine intake airflow for retarding the ignition timing, and means indicative of a change in the speed of said supercharger relative to the speed of said engine for adjusting said control unit.

8. An ignition timing system for an engine having a supercharger, comprising, an operating unit actuated by the pressure rise directly across said supercharger for advancing the ignition timing, an adjustable control unit connected to said operating unit and actuated by a pressure differential which is a measure of engine intake airflow for retarding the ignition timing, and means actuated by a change in a fluid pressure which change is indicative of a change in the detonation characteristics of the engine charge for adjusting said control unit.

DANA B. WARING.

REFERENCES CITED

The following references are of record in the file of this patent:

UNITED STATES PATENTS

| Number | Name | Date |
|---|---|---|
| 1,787,686 | Kerr | Jan. 6, 1931 |
| 2,064,864 | Temple | Dec. 22, 1936 |
| 2,217,364 | Halford | Oct. 8, 1940 |
| 2,320,886 | Quiroz | June 1, 1943 |
| 2,383,898 | Udale | Aug. 28, 1945 |
| 2,414,322 | Mock | Jan. 14, 1947 |